US009231244B2

(12) United States Patent
Oono et al.

(10) Patent No.: US 9,231,244 B2
(45) Date of Patent: Jan. 5, 2016

(54) POSITIVE ELECTRODE ACTIVE MATERIAL FOR LITHIUM ION BATTERY, METHOD OF PRODUCING THE SAME, ELECTRODE FOR LITHIUM ION BATTERY, AND LITHIUM ION BATTERY

(75) Inventors: Kouji Oono, Tokyo (JP); Satoru Oshitari, Tokyo (JP)

(73) Assignee: SUMITOMO OSAKA CEMENT CO., LTD. (JP)

( * ) Notice: Subject to any disclaimer, the term of this patent is extended or adjusted under 35 U.S.C. 154(b) by 0 days.

(21) Appl. No.: 14/002,016

(22) PCT Filed: Mar. 16, 2012

(86) PCT No.: PCT/JP2012/056881
§ 371 (c)(1),
(2), (4) Date: Aug. 28, 2013

(87) PCT Pub. No.: WO2012/128215
PCT Pub. Date: Sep. 27, 2012

(65) Prior Publication Data
US 2013/0337333 A1    Dec. 19, 2013

(30) Foreign Application Priority Data
Mar. 23, 2011  (JP) .................. 2011-064895

(51) Int. Cl.
*H01M 4/04* (2006.01)
*C01B 25/37* (2006.01)
(Continued)

(52) U.S. Cl.
CPC .............. *H01M 4/049* (2013.01); *C01B 25/37* (2013.01); *C01B 25/45* (2013.01); *H01M 4/5825* (2013.01);
(Continued)

(58) Field of Classification Search
CPC ........ H01M 4/049; H01M 4/50; C01B 25/41; C01B 25/26; C01B 25/455
See application file for complete search history.

(56) References Cited

U.S. PATENT DOCUMENTS

2010/0086855 A1* 4/2010 Kohmoto et al. .......... 429/231.6
2010/0178562 A1* 7/2010 Exnar et al. .................. 429/221
(Continued)

FOREIGN PATENT DOCUMENTS

| CA | 2678540 A1 * | 3/2011 | ............. H01M 4/48 |
|---|---|---|---|
| JP | A-2004-039509 | 2/2004 | |
| JP | A-2006-286208 | 10/2006 | |
| JP | A-2007-119304 | 5/2007 | |
| JP | A-2009-532323 | 9/2009 | |
| WO | WO 2007/034823 A1 | 3/2007 | |
| WO | WO 2007/113624 A1 | 10/2007 | |

OTHER PUBLICATIONS

International Search Report for International Patent Application No. PCT/JP2012/056881 (mailed Jun. 19, 2012).
(Continued)

*Primary Examiner* — Jeremiah Smith
(74) *Attorney, Agent, or Firm* — Merchant & Gould P.C.

(57) ABSTRACT

Provided is a positive electrode active material for lithium ion batteries, which is capable of realizing stability and safety at a high voltage, a high energy density, high load characteristics, and long-term cycle characteristics by controlling a crystal shape of $LiMnPO_4$ particles having a crystal structure very suitable for Li diffusion or controlling an average primary particle size, a production method thereof, an electrode for lithium ion batteries, and a lithium ion battery. The positive electrode active material for lithium ion batteries of the invention is a positive electrode active material for lithium ion batteries, which is formed from $LiMnPO_4$. Values of lattice constants a, b, and c, which are calculated from an X-ray diffraction pattern, satisfy 10.41 Å<a≤10.43 Å, 6.070 Å<b≤6.095 Å, and 4.730 Å<C≤4.745 Å, and an average particle size is 10 to 100 nm.

6 Claims, 3 Drawing Sheets

(51) Int. Cl.
*H01M 4/58* (2010.01)
*C01B 25/45* (2006.01)
*C01B 25/455* (2006.01)
*H01M 10/60* (2014.01)
*C01B 25/26* (2006.01)
*H01M 4/36* (2006.01)
*C01B 25/41* (2006.01)
*H01M 4/50* (2010.01)
*H01M 4/505* (2010.01)
*H01M 10/0525* (2010.01)

(52) U.S. Cl.
CPC .............. *C01B 25/26* (2013.01); *C01B 25/41* (2013.01); *C01B 25/455* (2013.01); *H01M 4/366* (2013.01); *H01M 4/50* (2013.01); *H01M 4/505* (2013.01); *H01M 10/0525* (2013.01); *H01M 10/50* (2013.01); *Y02T 10/7011* (2013.01)

(56) References Cited

U.S. PATENT DOCUMENTS

| | | | |
|---|---|---|---|
| 2010/0233058 A1* | 9/2010 | Sano et al. | 423/306 |
| 2010/0304217 A1* | 12/2010 | Suzuki et al. | 429/224 |
| 2011/0037019 A1* | 2/2011 | Nakano et al. | 252/182.1 |
| 2011/0269025 A1* | 11/2011 | Sun et al. | 429/231.5 |
| 2012/0237833 A1* | 9/2012 | Guerfi et al. | 429/303 |

OTHER PUBLICATIONS

Padhi et al., *J. Electrochem. Soc.*, 144(4):1188-94 (1997).
Yamada et al., *Nature Materials*, 5:357-60 (2006).
Chen et al. "Solid Solution Phases in the Olivine-Type $LiMnPO_4$/$MnPO_4$" *J. of the Electrochemical Soc.*, 156(9):A756-A762 (2009).
Dokko et al. "$LiMnPO_4$ Nanoparticles Prepared through the Reaction between $Li_3PO_4$ and Molten Aqua-complex of $MnSO_4$" *J. of the Electrochemical Soc.*, 158(12): A1275-A1281 (2011).

* cited by examiner

POSITIVE ELECTRODE ACTIVE MATERIAL FOR LITHIUM ION BATTERY, METHOD OF PRODUCING THE SAME, ELECTRODE FOR LITHIUM ION BATTERY, AND LITHIUM ION BATTERY

This application is a U.S. National Stage Application under 35 U.S.C. §371 of International Patent Application No. PCT/JP2012/056881 filed 16 Mar. 2012, which claims the benefit of priority to Japanese Patent Application No. 2011-064895 filed 23 Mar. 2011, the disclosures of all of which are hereby incorporated by reference in their entireties. The International Application was published in Japanese on 27 Sep. 2012 as WO 2012/128215.

TECHNICAL FIELD

The present invention relates to a positive electrode active material for lithium ion batteries, a method of producing the same, an electrode for lithium ion batteries, and a lithium ion battery. More particularly, the invention relates to a positive electrode active material for lithium ion batteries for which stability and safety at a high voltage, a high energy density, high load characteristics, and long-term cycle characteristics may be expected by controlling a crystal shape of $LiMnPO_4$ particles having a crystal, structure very suitable for Li diffusion or controlling an average primary particle size, a method of producing the same, an electrode for lithium ion batteries which uses the positive electrode active material for lithium ion batteries, and a lithium ion battery.

BACKGROUND

Recently, as a battery that meets the expectations for miniaturization, lightness, and high capacity, a non-aqueous electrolytic solution-based secondary battery such as a lithium ion battery has been suggested and put into practical use. The lithium ion battery includes a positive electrode and a negative electrode which have properties capable of reversibly intercalating and deintercalating lithium ions, and a non-aqueous electrolyte.

The lithium ion battery is small in size, is light in weight, and has high energy compared to secondary batteries such as a lead battery, a nickel-cadmium battery, and a nickel-hydrogen battery in the related art, and thus the lithium ion battery has been used as a power supply of a portable electronic apparatus such as a cellular phone, and a note-book type personal computer. In addition, recently, an examination has also been made for a high-output power supply of an electric vehicle, a hybrid vehicle, and an electric tool. High-speed charge and discharge characteristics have been demanded for the electrode active material of the battery that is used as the high-output power supply.

Therefore, in terms of high functionability, high capacity, low cost, rare metal free, and the like of the above-described secondary battery, as a positive electrode active material, various kinds of materials have been examined. Among these, an olivine-type phosphate-based electrode active material represented by $LiFePO_4$ has attracted attention as an electrode active material from the viewpoints of safety, abundant resources, and low cost.

Among the phosphate-based electrode active materials, lithium manganese phosphate ($LiMnPO_4$), in which an alkali metal is Li and a transition metal is Mn, having a problem due to lithium manganese phosphate having a theoretical capacity of approximately 170 mAh/g that is substantially the same as that of $LiFePO_4$, but even under low-rate discharge conditions, material utilization being very poor compared to $LiFePO_4$ has been pointed out in various documents (refer to Non-Patent Document 1 and the like).

As one problem of the poor material utilization, a problem of slowness in Li diffusion inside an active material, which is derived from a structure of a phosphate-based electrode active material, such as $LiMnPO_4$, may be exemplified.

In the phosphate-based electrode active material, it is known that the Li diffusion inside the active material occurs only in a b-axis direction of a crystal lattice while being accompanied with phase conversion of two phases of $LiMnPO_4$ and $MnPO_4$ (refer to Non-Patent Document 2), and it is described that the phosphate-based electrode active material has a disadvantage for high-speed charge and discharge.

As an effective method to solve the problem, a method of shortening a crystal lattice length of $LiMnPO_4$ particles in the b-axis direction for the purpose of shortening a Li diffusion distance in the particles, a method of enlarging crystal lattice lengths along an a-axis and a c-axis for the purpose of securing a wide Li diffusion space, and a method of making the $LiMnPO_4$ particles fine for the purpose of increasing a reaction area between Li and $LiMnPO_4$ particles, and the like may be exemplified.

As a method of making the $LiMnPO_4$ particles fine, a method of making the $LiMnPO_4$ particles fine by mechanical pulverization is general (refer to Patent Document 1 and the like).

In addition, as another method, a method of making particles fine using polyhydric alcohols such as glycols and polyols which have a high boiling point is suggested (refer to Patent Document 2 and the like).

This method is a method of allowing $LiMnPO_4$ particles to precipitate while heating a sufficient amount of precursor in the polyhydric alcohols such as glycols and polyols which have a high boiling point.

CITATION LIST

Patent Document

[Patent Document 1] Republished Japanese Translation of WO2007/034823 of the PCT International Publication for Patent Applications
[Patent Document 2] PCT Japanese Translation Patent Publication No. 2009-532323

Non-Patent Document

[Non-Patent Document 1] A. K. Padhi, K. S, Nanjundaswamy, and J, B. Goodenough, J. Electrochem. Soc., Vol. 144, No. 4, 1 30 pp 188-1193 (1997)
[Non-Patent Document 2] A. Yamada, H. Koizumi, S, Nishimura, N. Sonoyama, R. Kanno, M. Yonemura, T. Nakamura, and Y. Kobayashi, Nature Materials 5, pp 357-360 (2006)

SUMMARY OF INVENTION

Technical Problem

However, in the method of making particles fine by the mechanical pulverization in the related art, it is difficult to shorten the crystal lattice length of particles in the b-axis direction. In addition, the mechanical pulverization has problems in that there is a limit for making particles fine, and it is difficult to make the particles sufficiently fine to reach a target particle size.

In a further not preferable aspect, the mechanical pulverization is prone to apply damage such as distortion or cracking to the LiMnPO$_4$ particles, and thus LiMnPO$_4$ that is inactive for charge and discharge has a tendency to be generated. As a result, there is a problem in that sufficient charge and discharge characteristics may not be obtained.

On the other hand, in the method of making particles fine using the polyhydric alcohols having a high boiling point, the particles are made finer compared to the mechanical pulverization. However, in the particles that are obtained, a lattice constant b of the crystal lattice increases to 6.101 Å. Therefore, there is a problem in that it is difficult to shorten the crystal lattice length of the particles in the b-axis direction, and thus it is difficult to obtain sufficient charge and discharge characteristics.

Furthermore, in terms of the low cost of the phosphate-based electrode active material, a method capable of producing the phosphate-based electrode active material in large quantities with good efficiency is preferable.

The invention has been made to solve the above-described problems, and an object thereof is to provide a positive electrode active material for lithium ion batteries, which is capable of realizing stability and safety at a high voltage, a high energy density, high load characteristics, and long-term cycle characteristics by controlling a crystal shape of LiMnPO$_4$ particles having a crystal structure very suitable for Li diffusion or controlling an average primary particle size, a method of producing the same, an electrode for lithium ion batteries which uses the positive electrode active material, for lithium ion batteries, and a lithium ion battery.

Solution to Problem

The present inventors have extensively studied to solve the above-described problems, and as a result, they have found that when values of lattice constants a, b, and c, which are calculated from an X-ray diffraction pattern of a positive electrode active material for lithium ion batteries which is formed from LiMnPO$_4$, are set to satisfy 10.41 Å<a≤10.43 Å, 6.070 Å<b≤6.095 Å, and 4.730 Å<C≤4.745 Å, LiMnPO$_4$ particles in which a crystal lattice length in a b-axis direction is specifically shortened while long crystal lattice lengths in an a-axis direction and a c-axis direction are maintained may be realized, and when the LiMnPO$_4$ particles are used, a lithium ion battery which is excellent in stability and safety at a high voltage, a high energy density, high load characteristics, long-term cycle characteristics may be realized, and they have accomplished the invention.

In addition, the present inventors have found that when raw material slurry obtained by mixing a Li source, a P source, and a Mn source with a solvent containing water as a main component is heated to a temperature within a range of 100 to 150° C., and synthesis is performed under compression, LiMnPO$_4$ particles in which a crystal lattice length in b-axis direction is specifically shortened while long crystal lattice lengths in an a-axis direction and a c-axis direction are maintained may be easily produced, and they have accomplished the invention.

That is, according to an aspect of the invention, there is provided a positive electrode active material for lithium ion batteries, which is formed from LiMnPO$_4$. Values of lattice constants a, b, and c, which are calculated from an X-ray diffraction pattern, satisfy 10.41 Å<a≤10.43 Å, 6.070 Å<b≤6.095 Å, and 4.730 Å<C≤4.745 Å.

In the positive electrode active material for lithium ion batteries of the invention, it is preferable that an average particle size be 10 to 100 nm.

According to still another aspect of the invention, a method is provided of producing a positive electrode active material for lithium ion batteries, which is formed from LiMnPO$_4$, by a hydrothermal synthesis method. The method includes a step of heating raw material slurry obtained by mixing a Li source, a P source, and a Mn source with a solvent containing water as a main component to a temperature within a range of 100° C. to 150° C., and performing synthesis under compression.

According to another aspect of the invention, an electrode is provided for lithium ion batteries. The electrode contains the positive electrode active material for lithium ion batteries of the invention.

According to still another aspect of the invention, there is provided a lithium ion battery including the electrode for lithium ion batteries of the invention.

Advantageous Effects of Invention

According to the positive electrode active material for lithium ion batteries of the in invention, since values of lattice constants a, b, and c, which are calculated from an X-ray diffraction pattern of the positive electrode active material for lithium ion batteries which is formed from LiMnPO$_4$, are set to satisfy 10.41 Å<a≤10.43 Å, 6.070 Å<b≤6.095 Å, and 4.730 Å<C≤4.745 Å, a crystal lattice length of LiMnPO$_4$ particles in a b-axis direction may be specifically shortened while long crystal lattice lengths in an a-axis direction and a c-axis direction are maintained. Accordingly, when the LiMnPO$_4$ particles in which the length in the b-axis direction which is very suitable for Li diffusion is specifically shortened are used, a lithium ion battery excellent in stability and safety at a high voltage, a high energy density, high load characteristics, and long-term cycle characteristics may be realized.

According to the method of producing the positive electrode active material for lithium ion batteries of the invention, since raw material slurry obtained by mixing a Li source, a P source, and a Mn source with a solvent containing water as a main component is heated to a temperature of 100 to 150° C., and synthesis is performed under compression, LiMnPO$_4$ particles in which a crystal lattice length in the b-axis direction is specifically shortened while long crystal lattice lengths in the a-axis direction and the c-axis direction are maintained may be easily produced.

DESCRIPTION OF EMBODIMENTS

An embodiment for carrying out a positive electrode active material for lithium ion batteries of the invention, a production method thereof, an electrode for lithium ion batteries, and a lithium ion battery will be described in detail.

In addition, the embodiment will be described in detail for easy comprehension of the gist of the invention, and the embodiment is not intended to limit the invention unless otherwise stated.

[Positive Electrode Active Material for Lithium Ion Batteries]

The positive electrode active material for lithium ion batteries of the embodiment is a positive electrode active material in which values of lattice constants a, b, and c, which are calculated from an X-ray diffraction pattern of a positive electrode active material for lithium ion batteries which is formed from $LiMnPO_4$ having a crystal structure very suitable for Li diffusion, satisfy 10.41 Å<a≤10.43 Å, 6.070 Å<b≤6.095 Å, and 4.730 Å<C≤4.745 Å.

Here, the reason why the values of the lattice constants a, b, and c of $LiMnPO_4$ are set to satisfy 10.41 Å<a≤10.43 Å, 6.070 Å<b≤6.095 Å, and 4.730 Å<C≤4.745 Å is that these ranges are ranges capable of realizing $LiMnPO_4$ particles in which crystal lattice lengths of the $LiMnPO_4$ in an a-axis direction and a c-axis direction being long, and a crystal lattice length thereof in a b-axis direction being specifically short may be realized.

It is preferable that an average particle size of $LiMnPO_4$ be 10 to 100 nm, and more preferably 15 to 60 nm.

Here, the reason why the average particle size is set to 10 to 100 mm is as follows. When the average particle size is less than 10 nm, the $LiMnPO_4$ particles are made excessively fine, and thus it is difficult to maintain the crystallinity to be satisfactory. As a result, $LiMnPO_4$ particles in which a crystal lattice length in a b-axis direction is specifically shortened while long crystal lattice lengths in an a-axis direction and a c-axis direction are maintained may not be obtained. On the other hand, when the average particle size exceeds 100 nm, the $LiMnPO_4$ particles are not made sufficiently fine, and as a result, it is difficult to obtain very fine $LiMnPO_4$ particles with satisfactory crystallinity. Accordingly, this range is not preferable.

[Method of Producing Positive Electrode Active Material for Lithium Ion Batteries]

The method of producing a positive electrode active material for lithium ion batteries of the embodiment is a method of producing the positive electrode active material for lithium ion batteries, which is formed from $LiMnPO_4$, by a hydrothermal synthesis method. The method includes a step of heating raw material slurry obtained by mixing a Li source, a P source, and a Mn source with a solvent containing water as a main component to a temperature within a range of 100 to 150° C., and performing synthesis under compression.

Examples of the Li source include hydroxides such as lithium hydroxide (LiOH), lithium salts of inorganic acids such as lithium carbonate ($Li_2CO_3$), lithium chloride (LiCl), lithium nitrate ($LiNO_3$), lithium phosphate ($Li_3PO_4$), dilithium hydrogen phosphate ($Li_2HPO_5$), and lithium dihydrogen phosphate ($LiH_2PO_4$), lithium salts of organic acids such as lithium acetate ($LiCH_3COO$) and lithium oxalate (($COOLi)_2$), hydrates thereof, and the like. One or more kinds selected from these may be suitably used.

As the P source, one or more selected from phosphoric acids such as orthophosphoric acid ($H_3PO_4$) and metaphosphoric acid ($HPO_3$), phosphates such as ammonium dihydrogen phosphate ($NH_4H_2PO_4$), diammonium hydrogen phosphate (($NH_4)_2HPO_4$), ammonium phosphate (($NH_4)_3PO_4$), lithium phosphate ($Li_3PO_4$), dilithium hydrogen phosphate ($Li_2HPO_4$), and lithium dihydrogen phosphate ($LiH_2PO_4$), and hydrates thereof may be suitably used.

As the Mn source, a Mn salt is preferable, and for example, one or more kinds selected from manganese (II) chloride ($MnCl_2$), manganese (II) sulfate ($MnSO_4$), manganese (II) nitrate ($Mn(NO_3)_2$), manganese (II) acetate ($Mn(CH_3COO)_2$), and hydrates thereof are preferable.

The solvent containing water as a main component represents any one of water alone, and a water-based solvent that contains water as a main component and contains an aqueous solvent such as an alcohol as necessary.

The aqueous solvent may be a solvent capable of dissolving the Li source, the P source, and the Mn source, and is not particularly limited. Examples of the aqueous solvent include alcohols such as methanol, ethanol, 1-propanol, 2-propanol (isopropyl alcohol: IPA), butanol, pentanol, hexanol, octanol, diacetone alcohol, esters such as ethyl acetate, butyl acetate, ethyl lactate, propylene glycol monomethyl ether acetate, propylene glycol monoethyl ether acetate, γ-butyrolactone, ethers such as diethyl ether, ethylene glycol monomethyl, ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether, ketones such as acetone, methyl ethyl ketone (MEK), methyl isobutyl ketone (MIBK), acetylacetone, and cyclohexanone, amides such as dimethylformamide, N,N-dimethylacetoacetamide, and N-methylpyrrolidone, glycols such as ethylene glycol, diethylene glycol, and propylene glycol, and the like. These may be used alone or in combination of two or more.

The Li source, the P source, and the Mn source are put into a solvent containing water as a main component in such a manner that a molar ratio (Li source:P source:Mn source) thereof becomes 3:1:1, and the sources are stirred and mixed to obtain raw material slurry.

When considering uniform mixing of the Li source, the P source, and the Mn source, a method in which the Li source, the P source, and the Mn source are made to enter an aqueous solution state at once, respectively, and then these aqueous solutions are mixed is preferable.

Since it is necessary to obtain very fine $LiMnPO_4$ particles with high purity and high crystallinity, it is preferable that the molar concentration of the Li source, the P source, and the Mn source in the raw material slurry be 1.5 to 4 mol/L.

Next, the raw material slurry is put into a pressure resistant vessel, and is heated to a temperature within a range of 100 to 150° C., and more preferably 120 to 145° C., and the hydrothermal treatment is performed for 1 to 48 hours to obtain $LiMnPO_4$ particles.

When reaching the temperature within a range of 100 to 150° C., a pressure inside the pressure resistant vessel becomes, for example, 0.1 to 0.7 MPa.

In this case, a particle size of the $LiMnPO_4$ particles may be controlled to a desired size by adjusting the temperature and the time during the hydrothermal treatment.

In this manner, $LiMnPO_4$ particles in which values of lattice constants a, b, and c satisfy 10.41 Å<a≤10.43 Å, 6.070 Å<b≤6.095 Å, and 4.730 Å<C≤4.745 Å may be obtained.

As described above, according to the positive electrode active material for lithium ion batteries of the embodiment, values of lattice constants a, b, and c, which are calculated from an X-ray diffraction pattern of the positive electrode active material for lithium ion batteries which is formed from $LiMnPO_4$, are set to satisfy 10.41 Å<a≤10.43 Å, 6.070 Å<b≤6.095 Å, and 4.730 Å<C≤4.745 Å. Therefore, a crystal lattice length of $LiMnPO_4$ particles in a b-axis direction may be specifically shortened while long crystal lattice lengths in an a-axis direction and a c-axis direction are maintained. Accordingly, when the $LiMnPO_4$ particles in which the length in the b-axis direction is specifically shortened to be suitable for Li diffusion and which are very fine are used, a lithium ion battery excellent in stability and safety at a high voltage, a high energy density, high load characteristics, and long-term cycle characteristics may be realized.

According to the method of producing the positive electrode active material for lithium ion batteries of the embodiment, raw material slurry obtained by mixing a Li source, a P source, and a Mn source with a solvent containing water as a main component is heated to a temperature within a range of 100° C. to 150° C., and synthesis is performed under compression. Therefore, very fine $LiMnPO_4$ particles in which a crystal lattice length in the b-axis direction is specifically shortened while long crystal lattice lengths in the a-axis direction and the c-axis direction are maintained may be easily produced.

EXAMPLES

Hereinafter, the invention will be described in detail with reference to examples and comparative examples, but the invention is not limited to the examples.

"Preparation of Powder"

Example 1

Synthesis of $LiMnPO_4$ was performed as described below.
$Li_3PO_4$ as the Li source and the P source, and aqueous $MnSO_4$ solution as the Mn source were used, and these were mixed in a molar ratio of Li:Mn:P=3:1:1 to prepare 200 ml of raw material slurry.

Next, the raw material slurry was put into a pressure resistant vessel, and the hydrothermal synthesis was performed at 100° C. for 1 hour. At this time, a pressure inside the pressure resistant vessel was 0.1 MPa.

After the reaction, the resultant product was cooled to room temperature, whereby a precipitate of a cake-shaped reaction product was obtained. The precipitate was sufficiently washed with distilled water a total of five times, and a moisture content of 30% was maintained so as not to be dried, whereby a cake-shaped material of Example 1 was obtained.

Next, a little amount of sample was collected from the precipitate, and this sample was vacuum-dried at 70° C. for 2 hours, whereby a powder of Example 1 was obtained.

An average particle size of the powder was measured using a laser diffraction-type particle size distribution measuring apparatus SALD-2100J (manufactured by Shimadzu Corporation), and the measured average particle size was 17 nm.

The powder was identified using an X-ray diffraction apparatus, and it was confirmed that single-phase $LiMnPO_4$ was generated. In addition, values of lattice constants were calculated from an X-ray diffraction pattern of the powder, and it could be seen that a=10.419 Å, b=6.086 Å, and c=4.734 Å.

In addition, the shape of the $LiMnPO_4$ particles which was observed from a scanning electron microscope (SEM) image of the powder was a characteristic plate crystal.

Furthermore, it could be seen that among peaks of X-ray intensity seen from the X-ray diffraction pattern, a peak derived from reflection of the b-axis was shown to be large, and thus the thickness direction of the plate-shaped crystal was the b-axis direction.

Example 2

A cake-shape material and a powder of Example 2 were obtained in the same manner as Example 1 except that the hydrothermal synthesis conditions of the raw material slurry were set to 130° C. and 1 hour.

An average particle size of the powder was measured using a laser diffraction-type particle size distribution measuring apparatus SALD-2100J (manufactured by Shimadzu Corporation), and the measured average particle size was 39 nm.

The powder was identified using an X-ray diffraction apparatus, and it was confirmed that single-phase $LiMnPO_4$ was generated. In addition, values of lattice constants were calculated from an X-ray diffraction pattern of the powder, and it could be seen that a=10.429 Å, b=6.085 Å, and c=4.735 Å.

In addition, the shape of the $LiMnPO_4$ particles which was observed from a scanning electron microscope (SEM) image of the powder was a characteristic plate crystal.

Furthermore, it could be seen that among peaks of X-ray intensity seen from the X-ray diffraction pattern, a peak derived from reflection of the b-axis was shown to be large, and thus the thickness direction of the plate-shaped crystal was the b-axis direction.

Figure 1:
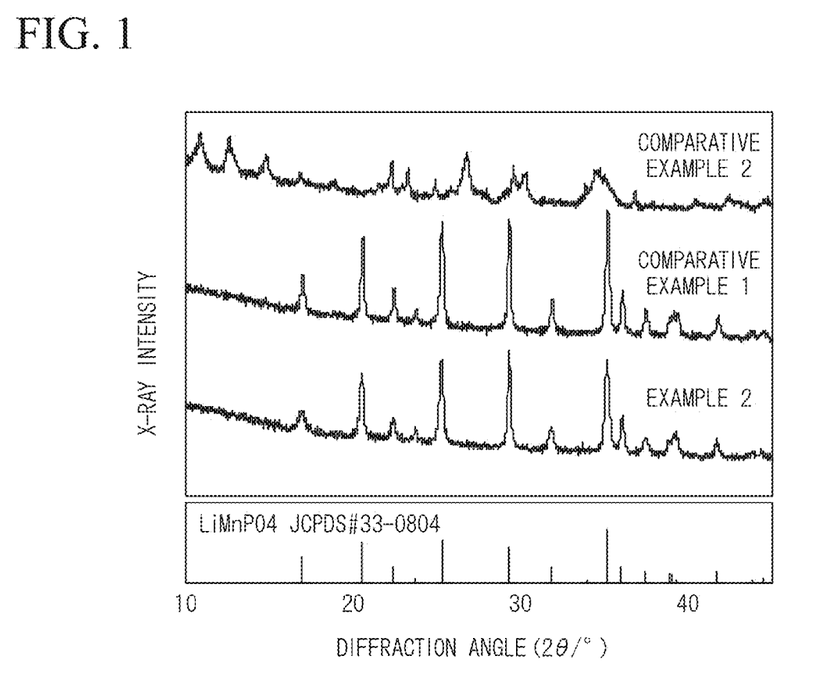
FIG. 1 is a diagram illustrating an X-ray diffraction pattern of powders of Example 2 of the invention, and Comparative Examples 1 and 2, respectively.
Figure 2:
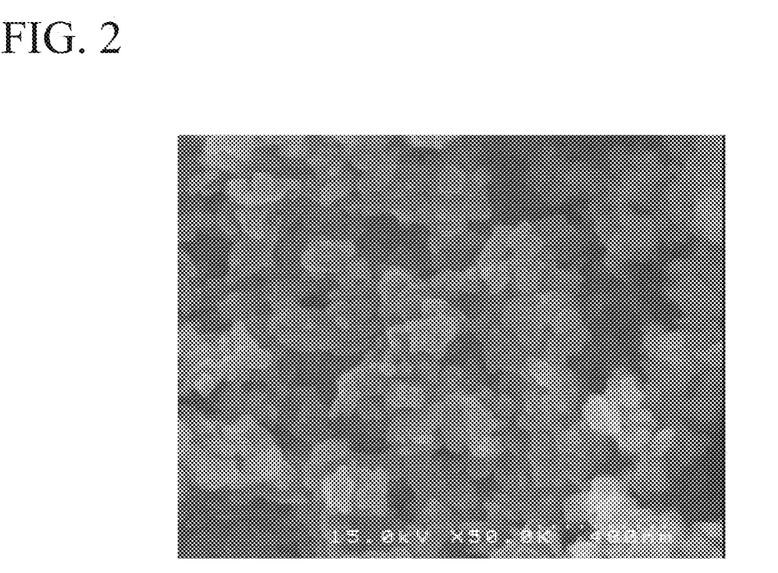
FIG. 2 is a scanning electron microscope (SEM) image of a powder of Example 2 of the invention.

The X-ray diffraction pattern and the scanning electron microscope (SEM) image of the powder of Example 2 are shown in FIG. 1 and FIG. 2, respectively. In addition, the positions of diffraction lines of $LiMnPO_4$, which are described in JCPDS Card No. 33-0804, are shown at the bottom of FIG. 1.

Example 3

A cake-shape material and a powder of Example 3 were obtained in the same manner as Example 1 except that the hydrothermal synthesis conditions of the raw material slurry were set to 150° C. and 1 hour.

An average particle size of the powder, was measured using a laser diffraction-type particle size distribution measuring apparatus SALD-2100J (manufactured by Shimadzu Corporation), and the measured average particle size was 78 nm.

The powder was identified using an X-ray diffraction apparatus, and it was confirmed that single-phase $LiMnPO_4$ was generated. In addition, values of lattice constants were calculated from an X-ray diffraction pattern of the powder, and it could be seen that a=10.424 Å, b=6.088 Å, and c=4.739 Å.

In addition, the shape of the $LiMnPO_4$ particles which was observed from a scanning electron microscope (SEM) image of the powder was a characteristic plate crystal.

Furthermore, it could be seen that among peaks of X-ray intensity seen from the X-ray diffraction pattern, a peak derived from reflection of the b-axis was shown to be large, and thus the thickness direction of the plate-shaped crystal was the b-axis direction.

Comparative Example 11

A cake-shape material and a powder of Comparative Example 1 were obtained in the same manner as Example 1 except that the hydrothermal synthesis conditions of the raw material slurry were set to 170° C. and 1 hour.

An average particle size of the powder was measured using a laser diffraction-type particle size distribution measuring apparatus SALD-2100J (manufactured by Shimadzu Corporation), and the measured average particle size was 132 nm.

The powder was identified using an X-ray diffraction apparatus, and it was confirmed that single-phase $LiMnPO_4$ was generated. In addition, values of lattice constants were calculated from an X-ray diffraction pattern of the powder, and it could be seen that a=10.443 Å, b=6.102 Å, and c=4.748 Å.

In addition, the shape of the LiMnPO$_4$ particles which was observed from a scanning electron microscope (SEM) image of the powder was a characteristic columnar crystal.

Figure 3:
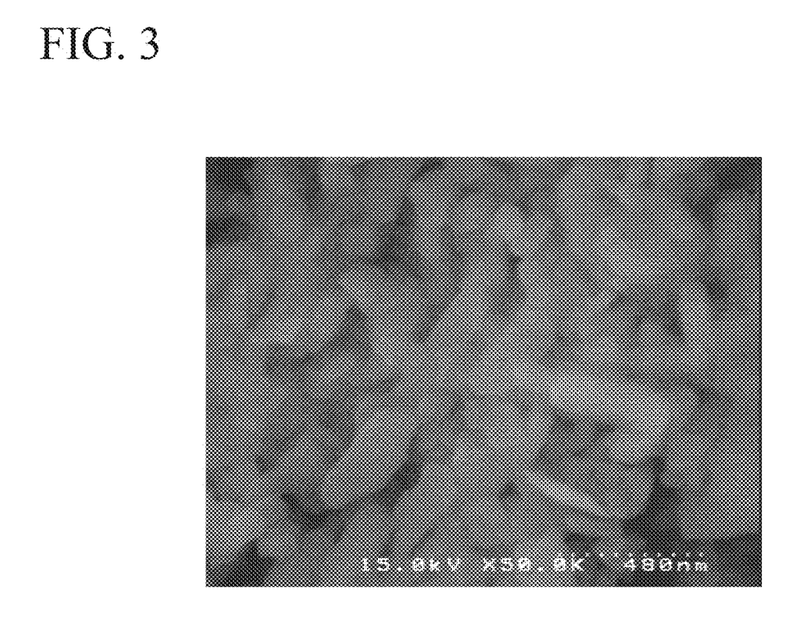
FIG. 3 is a scanning electron microscope (SEM) image of a powder of Comparative Example 1.

The X-ray diffraction pattern and the scanning electron microscope (SEM) image of the powder of Comparative Example 1 are shown in FIG. 1 and FIG. 3, respectively.

Comparative Example 2

A cake-shape material and a powder of Comparative Example 2 were obtained in the same manner as Example 1 except that the hydrothermal synthesis conditions of the raw material slurry were set to 9000 and 1 hour.

An average particle size of the powder was measured using a laser diffraction-type particle size distribution measuring apparatus SALD-2100J (manufactured by Shimadzu Corporation), and the measured average particle size was 31 nm.

The powder was identified using an X-ray diffraction apparatus, and it was confirmed that single-phase LiMnPO$_4$ was not generated, and a mixed material of Li$_3$PO$_4$ and Mn$_2$P$_2$O$_7$ hydrate was generated.

Figure 4:
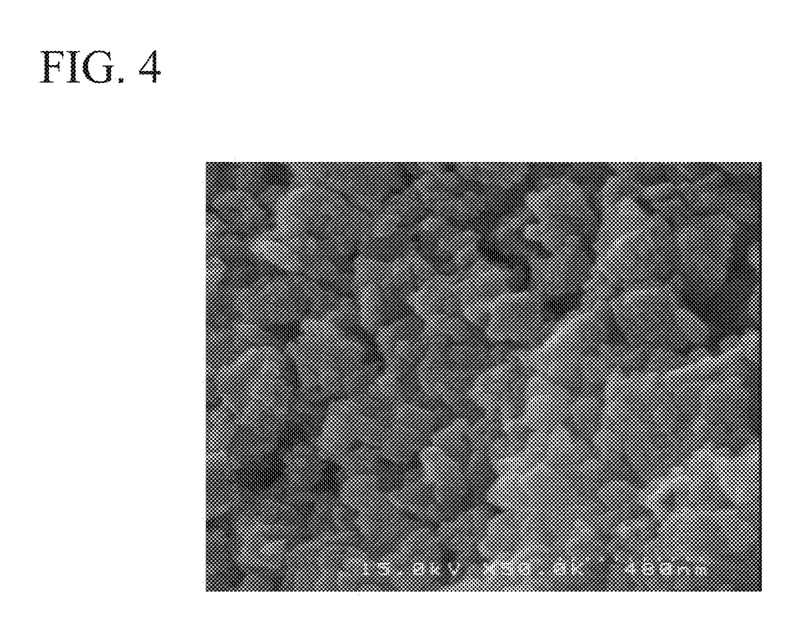
FIG. 4 is a scanning electron microscope (SEM) image of a powder of Comparative Example 2.

The X-ray diffraction pattern and the scanning electron microscope (SEM) image of the powder of Comparative Example 2 are shown in FIG. 1 and FIG. 4, respectively.

"Preparation of Lithium Ion Battery"

The powders that were obtained in Examples 1 to 3 and Comparative Examples 1, respectively, acetylene black (AB) as a conductive auxiliary agent, polyvinylidene fluoride (PVdF) as a binder, and N-methyl-2-pyrrolidinone (NMP) as a solvent were used, and these were mixed to prepare positive electrode material paste of each of Examples 1 to 3 and Comparative Examples 1. In addition, a mass ratio in the paste, that is, powder:AB:PVdF was 80:10:10.

Then, the positive electrode material paste was applied on aluminum (Ai) foil having a thickness of 30 μm, and was dried. Then, the resultant aluminum foil was compressed at a pressure of 30 MPa to prepare a positive electrode plate.

Then, the positive electrode plate was punched in a disk shape having a diameter of 16 mm using a shaping machine to prepare a positive electrode for test.

On the other hand, a commercially available Li metal plate was used as a negative electrode, a porous polypropylene film was used as a separator, and a LiPF$_4$ solution of 11 mol/L used as a non-aqueous electrolyte solution was used an a non-aqueous electrolyte. In addition, lithium ion batteries of Examples 1 to 3, and Comparative Example 1 were prepared using a mixed solution in which a volume ratio between ethylene carbonate and diethyl carbonate was 1:1 as a solvent of the LiPF$_4$ solution, and a 2032 coin-type cell.

"Battery Characteristics Test"

A battery characteristics test of the lithium ion batteries of Examples 1 to 3, and Comparative Example 1 was performed. In the test, charging was performed at an environmental temperature of 25° C. and with a charge current of 0.1 CA until an electrical potential of the positive electrode became 4.5 V with respect to an equilibrium potential of Li. After a pause for one minute, discharging was performed with a discharge current of 0.1 CA until it reached 2.0 V.

Figure 5:
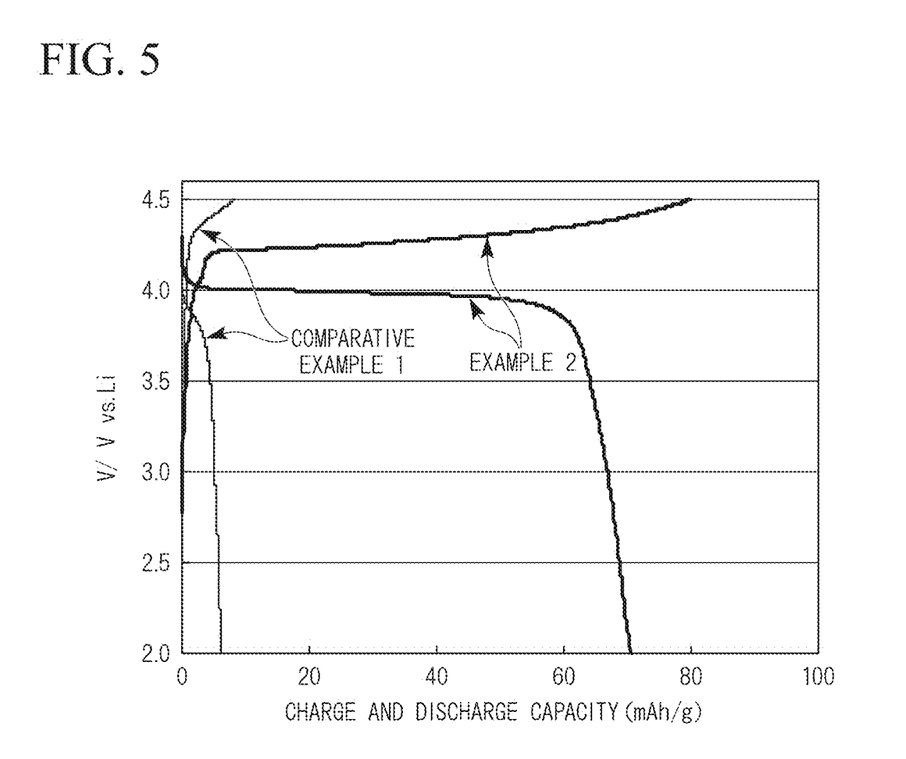
FIG. 5 is a diagram illustrating charge and discharge curves of 0.1 CA of Example 2 of the invention, and Comparative Example 1, respectively.

0.1 C discharge capacity and 1 C discharge capacity of Examples 1 to 3, and Comparative Example 1 at the environmental temperature of 25° C. are shown in Table 1, respectively. In addition, charge and discharge curves of 0.1 CA of Example 2 and Comparative Example 1 are shown in FIG. 5, respectively.

TABLE 1

| | | Example 1 | Example 2 | Example 3 | Comparative Example 1 | Comparative Example 2 |
|---|---|---|---|---|---|---|
| Temperature during hydrothermal synthesis (° C.) | | 100 | 130 | 150 | 170 | 90 |
| Pressure (MPa) | | 0.1 | 0.3 | 0.5 | 0.8 | 0.05 |
| Crystal phase | | LiMnPO$_4$ single phase | LiMnPO$_4$ single phase | LiMnPO$_4$ single phase | LiMnPO$_4$ single phase | Li$_3$PO$_4$ and Mn$_2$P$_2$O$_7$ hydrate |
| Lattice constants (Å) | a | 10.419 | 10.429 | 10.424 | 10.443 | — |
| | b | 6.086 | 6.085 | 6.088 | 6.102 | — |
| | c | 4.734 | 4.735 | 4.739 | 4.748 | — |
| 0.1 C discharge capacity (mAh/g) | | 72 | 73 | 67 | 0.8 | — |
| 1 C discharge capacity (mAh/g) | | 49 | 46 | 39 | 0.01 | — |

As shown in Table 1, when comparing the lattice constants, which were calculated from the X-ray diffraction pattern of the LiMnPO$_4$ powders obtained in Examples 1 to 3, and Comparative Example 1, with each other, the following result was obtained. That is, the b-axis lattice constant of the powder obtained in Examples 1 to 3 was specifically smaller than of the b-axis lattice constant of the powder obtained in Comparative Example 1.

In addition, in Examples 1 to 3, acetylene black was used as the conductive auxiliary agent. However, a carbon material such as carbon black, graphite, ketjen black, natural graphite, and artificial graphite may be used.

In addition, the commercially available Li metal plate was used as the negative electrode. However, negative electrode materials such as carbon materials including natural graphite, artificial graphite, and cokes, a lithium alloy, and Li$_4$Ti$_5$O$_{12}$ may be used in place of the Li metal plate.

In addition, the LiPF$_6$ solution was used as the non-aqueous electrolyte solution, and the solution in which a volume ratio between ethylene carbonate and diethyl carbonate was 1:1 was used as the solvent of the LiPF$_6$ solution. However, a LiBF$_4$ or LiClO$_4$ solution may be used in place of LiPF$_6$, and propylene carbonate or diethyl carbonate may be used in place of ethylene carbonate.

In addition, a solid electrolyte may be used in place of the electrolytic solution and the separator.

INDUSTRIAL APPLICABILITY

According to the positive electrode active material for lithium ion batteries of the invention, since the values of lattice constants a, b, and c, which are calculated from the X-ray diffraction pattern of the positive electrode active material for lithium ion batteries which is formed from LiMnPO$_4$, are set to satisfy 10.4.1 Å<a≤10.43 Å, 6.070 Å<b≤6.095 Å, and 4.730 Å<C≤4.745 Å, a crystal lattice length of LiMnPO$_4$ particles in the b-axis direction may be specifically shortened while long crystal lattice lengths in the a-axis direction and the c-axis direction are maintained. In addition, when the LiMnPO$_4$ particles in which the length in the b-axis direction which is very suitable for Li diffusion is specifically shortened are used, a lithium ion battery excellent in stability and safety at a high voltage, a high energy density, high load characteristics, and long-term cycle characteristics may be realized. Accordingly, the invention may be suitably used for a positive electrode active material for lithium ion batteries, which is formed from $LiMnPO_4$. In addition, when an electrode for lithium ion batteries is prepared using the positive electrode active material for lithium ion batteries of the invention, and a lithium ion battery is prepared using the electrode for lithium ion batteries, the invention may be suitably used as the electrode for lithium ion batteries and the lithium ion battery.

According to the method of producing the positive electrode active material for lithium ion batteries of the invention, since the raw material slurry obtained by mixing the Li source, the P source, and the Mn source with the solvent containing water as a main component is heated to a temperature within a range of 100 to 150° C., and synthesis is performed under compression, $LiMnPO_4$ particles in which a crystal lattice length in the b-axis direction is specifically shortened while long crystal lattice lengths in the a-axis direction and the c-axis direction are maintained may be easily produced. Accordingly, the invention may be suitably used for a method of producing a positive electrode active material for lithium ion batteries, which is formed from $LiMnPO_4$.

We claim:

1. A positive electrode active material for lithium ion batteries, which is formed from $LiMnPO_4$ particles,
wherein lattice constants a, b, and c, which are calculated from an X-ray diffraction pattern of the $LiMnPO_4$ particles, have values satisfying 10.41 Å<a≤10.43 Å, 6.070 Å<b≤6.086 Å, and 4.730 Å<c≤4.745 Å;
an average particle diameter of the LiMnPO4 particles is 10 to 100 nm,
wherein the $LiMnPO_4$ particles are obtained by a hydrothermal synthesis method, the method comprising: a step of heating raw material slurry obtained by mixing a Li source, a P source, and a Mn source with a solvent containing water as a main component to a maximum temperature within a range of 100 to 130° C., and performing synthesis under compression at a temperature below or equal to the maximum temperature, and
wherein the maximum temperature of the hydrothermal synthesis is the highest temperature to which the $LiMnPO_4$ particles are heated during the production of the positive electrode active material.

2. The positive electrode active material for lithium ion batteries according to claim 1, wherein an average particle diameter of the $LiMnPO_4$ particles is 15 to 60 nm.

3. The positive electrode active material for lithium ion batteries according to claim 1, wherein the hydrothermal synthesis method comprises performing hydrothermal synthesis under compression for 1 to 48 hours.

4. An electrode for lithium ion batteries, containing: the positive electrode active material for lithium ion batteries according to claim 1.

5. A lithium ion battery, comprising: the electrode for lithium ion batteries according to claim 4.

6. A method of producing a positive electrode active material comprising $LiMnPO_4$ particles for lithium ion batteries, the method comprising:
producing $LiMnPO_4$ particles having an average particle diameter of 10 to 100 nm and lattice constants a, b, and c, which satisfy 10.41 Å<a 10.43 Å, 6.070 Å<b≤ 6.086 Å, and 4.730 Å<c≤4.745 Å by a hydrothermal synthesis process,
wherein the hydrothermal synthesis includes a step of heating raw material slurry obtained by mixing a Li source, a P source, and a Mn source with a solvent containing water as a main component to a maximum temperature within a range of 100 to 130° C., and performing synthesis under compression at a temperature at or below the maximum temperature, and
wherein the maximum temperature of the hydrothermal synthesis is the highest temperature to which the $LiMnPO_4$ particles are heated during the production of the positive electrode active material.

* * * * *